United States Patent [19]

Weissberg

[11] Patent Number: 4,658,737
[45] Date of Patent: Apr. 21, 1987

[54] PLANTING IMPLEMENT

[76] Inventor: Elsa Weissberg, 135 W. 83rd St.-Penthouse B, New York, N.Y. 10028

[21] Appl. No.: 761,523

[22] Filed: Aug. 1, 1985

[51] Int. Cl.⁴ .................................................. A01C 11/00
[52] U.S. Cl. ...................................... 111/2; 248/351; 47/42
[58] Field of Search .................................... 111/2-4, 111/89, 99; 47/42-47, 76; 256/1; 248/216.4, 351, 359, 511, 219.4, 218.3, 507, 508, 512, 513, 186; 52/292

[56] References Cited

U.S. PATENT DOCUMENTS

| | | | |
|---|---|---|---|
| 283,594 | 8/1883 | Gairand | 111/2 |
| 350,281 | 10/1886 | Wrightsman | 248/351 |
| 535,887 | 3/1895 | Brown | 111/2 X |
| 736,252 | 8/1903 | Hering | 111/2 |
| 1,275,070 | 8/1918 | Moncrief | 248/216.4 |
| 1,336,580 | 4/1920 | Parr | 47/46 X |
| 2,138,812 | 12/1938 | Akers et al. | 248/359 F |
| 2,296,217 | 9/1942 | Maloney | 47/43 |
| 2,501,255 | 3/1950 | Bell | 248/511 X |
| 3,165,863 | 1/1965 | Duran | 47/47 |
| 3,494,071 | 2/1970 | Simmon | 47/44 |

FOREIGN PATENT DOCUMENTS

| | | | |
|---|---|---|---|
| 188138 | 2/1956 | Austria | 111/2 |
| 451243 | 10/1927 | Fed. Rep. of Germany | 47/44 |
| 2242928 | 5/1975 | France | 47/44 |
| 2247157 | 6/1975 | France | 47/44 |
| 34415 | 3/1946 | India | 47/44 |
| 500140 | of 1892 | United Kingdom | 47/42 |

Primary Examiner—James R. Feyrer
Attorney, Agent, or Firm—Stanger, Michaelson and Einschlag

[57] ABSTRACT

Apparatus for a planter, and particularly one suitable for use in planting trees, shrubs or other woody perennials, is described. Specifically, this apparatus comprises a supporting member, having two ends and being longer than a maximum distance across the top of the planting hole, which lies on the ground and straddles the top of the planting hole; a holding device for securing the plant to the supporting member at a position intermediate these two ends, and earth anchors for securing the supporting member to the ground on at least one side of the planting hole to prevent the planter from rotating over the hole. Furthermore, the supporting member may comprise a center section and a number of coaxially aligned telescoping sections, each of which can be placed in one of a number of different positions in order to easily increase or decrease the length of the planter. This allows the planter to be used with a wide variety of differently sized planting holes.

9 Claims, 12 Drawing Figures

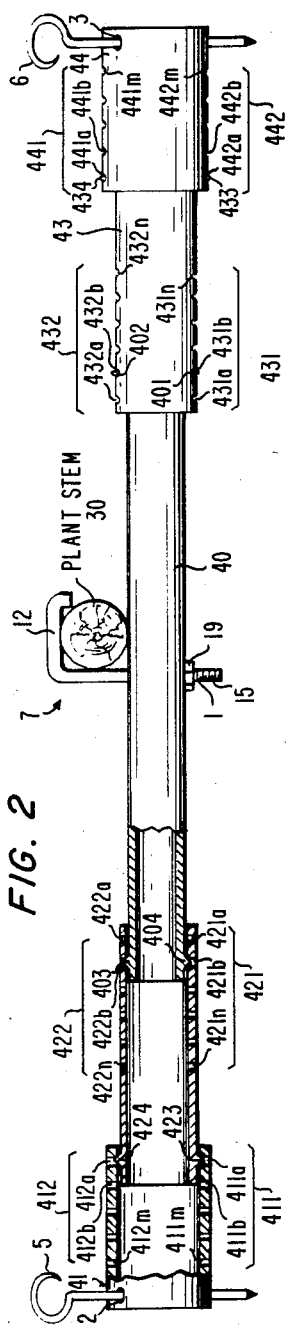
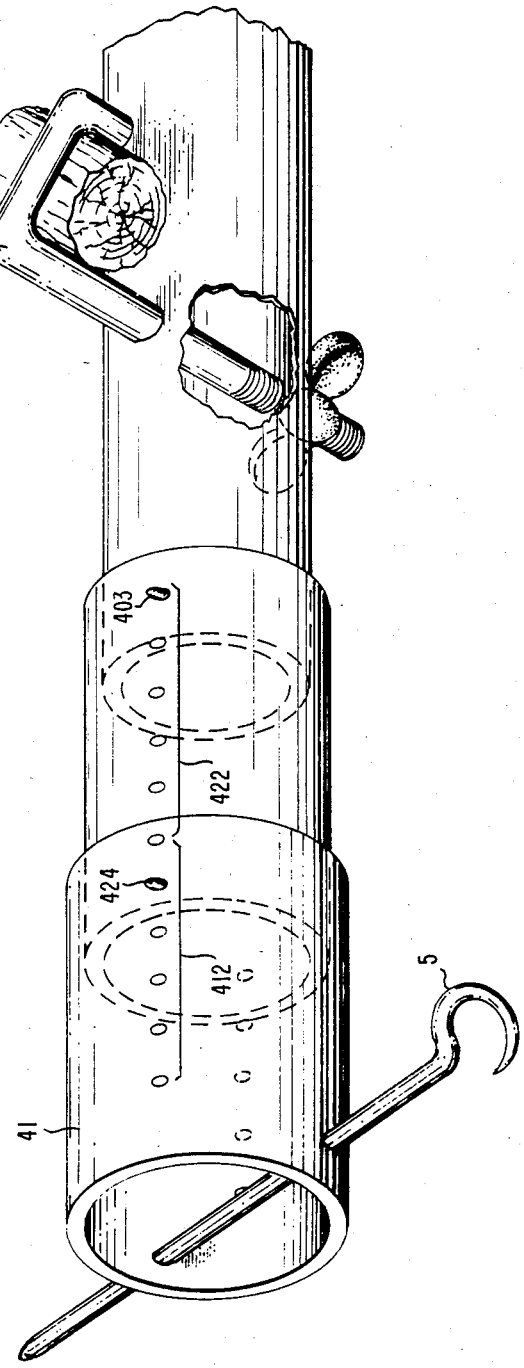
FIG. 2
FIG. 3

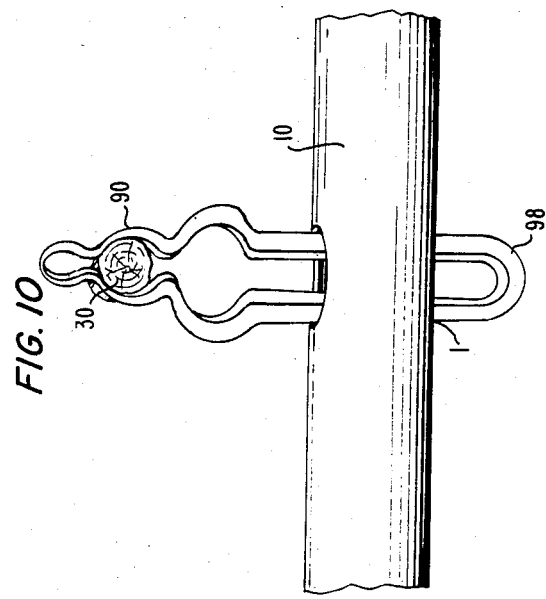
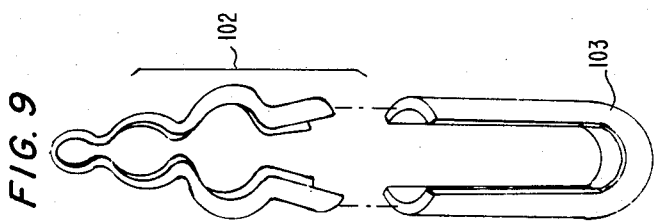
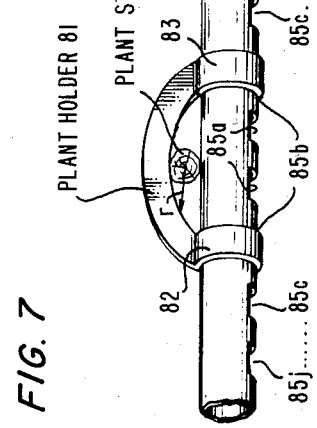
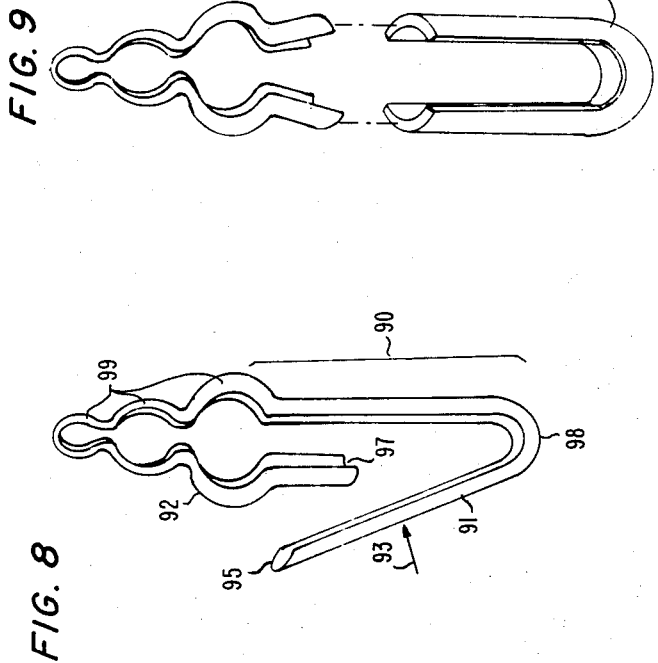
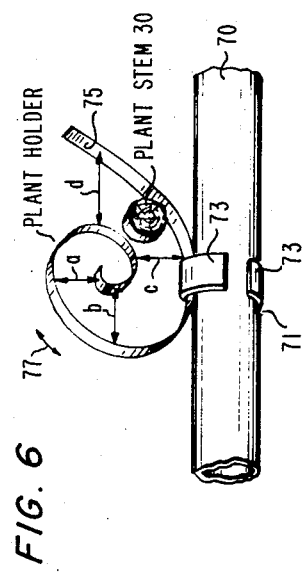

PLANTING IMPLEMENT

BACKGROUND OF THE INVENTION

1. Field of the Invention

This invention pertains to garden implements, specifically planters, and particularly to those suitable for use in planting small trees, shrubs or other woody perennials.

2. Description of the Prior Art

Successful planting of woody perennials such as shrubs, bushes and trees (hereinafter collectively referred to as woody perennials) is more complex and demanding than planting annuals. Woody perennials are long-lived plants that are set into their permanent locations. Often they are planted for the fruit or flowers they bear. Some fruiting varieties, even when planted properly, will not produce a sizable crop of fruit for several years until the plant has become well established. A careless planting might unfortunately retard that crop by an additional year or two. In addition, woody perennials and their roots are generally larger when planted than those of annuals, and thus require larger planting holes. It is obvious that properly placing a large shrub in a large hole is more demanding than planting a small seedling.

There are three main steps to planting a woody perennial. First, a suitably wide and deep planting hole must be dug. Second, the soil that is to fill the hole should be amended to aerate it and enrich it with the proper nutrients required by the plant. Third, the roots of the plant should be placed at the proper depth in the hole and then covered with the amended soil. This soil is then firmed down to eliminate any air pockets, after which the plant is then watered in. At this point, the position of the crown of the plant [the place on the plant where the stem and roots meet] is critical. Ideally, the crown should be at the soil level within the hole, and the top of the hole should be level with the surrounding soil.

While the first two steps are not difficult for many gardeners, the third step often presents problems that many gardeners cannot readily overcome. The main problem is that the gardener must have keen visual judgment to determine the proper vertical point at which to start placing the roots in order to have the crown located at the ideal position, i.e. at the soil level, after planting has been completed. Unfortunately, many gardeners do not have this ability and thus produce poor results. This is recognized in the book *One Hundred Garden Plans* by Andrew R. Addkison (Random House Inc., New York)—hereinafter referred to as Addkison—which states at page 25:

"A common mistake many people make in shrub planting is to bury the crown of the plant too low in the soil. Set bushes so the soil level is almost the same as it was when you bought the plant at the nursery."

Woody perennials can be purchased either container-grown with soil around their roots or bare-rooted. While container-grown shrubs can be planted with relative ease and accuracy, planting bare-rooted shrubs is somewhat difficult and made more so whenever that shrub is to be set into an unusually large hole. Many woody perennials are planted under one or both of these conditions: bare-rooted planting or planting in a large hole.

Blueberries, for example, are usually planted under both of these conditions. First, they are normally planted in their dormant season and therefore are planted bare-rooted. Also, they require extremely acid and moist soil having excellent drainage. Second, to meet this soil requirement, many experts recommend planting them in an unusually large hole, typically three feet wide and two feet deep. As discussed below, blueberry planting epitomizes the difficulties of bare-root, large hole planting.

The first difficulty occurs in the physical position the gardener must assume in this kind of planting. It is an unnatural and stressful position which quickly produces great strain on the gardener's back and may even cause long-lasting medical problems. Specifically, the gardener must crouch on his knees with his arms fully extended 18 inches [to the center of a three foot planting hole], holding the bare-rooted plant with one hand while spreading, then covering, the roots using the other hand In this position, the gardener's back is virtually horizontal, with nothing, apart from the gardener's back muscles, supporting the weight of his torso. As a result and after a fairly short period of time, intense pain occurs in these back muscles. If the gardener is planting alone, a long time will be spent in this painful position, since all the work of spreading and covering the roots must be done with one hand, while the other hand holds the plant. Spreading the roots can be done rather quickly. However, covering them with the necessary three or four inches of soil will take much longer. This occurs because these three or four inches of soil must also be added to the entire three foot planting hole, and this is a large volume of soil to place. Since the gardener has only one free hand to accomplish this while still on his knees, he is forced to use a small hand tool, e.g. a trowel, to add all the necessary soil. It is nearly impossible for a gardener to use a large heavy tool, e.g. a spade, with one hand particularly while he is crouching on his knees.

Another difficulty confronts the gardener while he is in this painful crouching position. Specifically, he must try to determine the proper vertical placement for the crown while looking down on the plant, with the nearest reference point, i.e. the rim of the planting hole, being some 18 inches away. It is difficult, if not impossible, to make an accurate judgment in this position. Instead, the gardener must drop his head to one side of his body in order to view the vertical position of the crown in relation to the rim on the far side of the planting hole, much like a land surveyor sights a tree. If several sightings are needed, this increases the amount of time the gardener must spend in this back-straining position.

A third difficulty arises when the planted perennial is watered in. Loose aerated soil in the planting hole will lose a good deal of air when watered and hence may sink quite a few inches, taking the crown of the plant with it. This explains the condition referred to above by Addkison. A sunken planting is undesirable, both aesthetically and for practical reasons.

To correct a sunken planting, the gardener has three choices, all of them harmful to the plant: [a]he can add more soil to the planting hole, thereby burying the crown; [b]he can pull the crown of the plant up to the proper level, thereby damaging the roots and possibly killing the plant; or, [c]he can dig up the plant and start over, thereby causing much stress to the plant and considerable strain for himself, with no guarantee that he will plant more successfully the second time.

Clearly, the successful planting of many woody perennials presents numerous difficulties and imparts significant physical strain to the gardener which the present invention seeks to correct.

SUMMARY OF THE INVENTION

Accordingly, one object of the present invention is to provide a planter which significantly simplifies the task of planting woody perennial plants while at the same time substantially eliminating the physical strain experienced by gardeners in such planting operations.

A further object of the present invention is to provide a planter which holds a plant at the proper vertical level, within the planting hole, throughout transplanting in order to assure a visually level planting while advantageously eliminating the need for the gardener to accurately and constantly judge, during transplanting, what the expected height of the plant will be after transplanting.

Another object is to provide a planter which supports the plant at the proper vertical height while freeing both hands of the gardener for other tasks, such as spreading the roots of the plant and filling the hole with soil, thereby advantageously reducing the time needed to perform the transplant.

A further object is to provide a planter which advantageously minimizes the need for the gardener to assume a crouching position during transplanting, thereby advantageously minimizing any back backache experienced by the gardener while planting.

An additional object is to provide a planter which supports the plant at the proper vertical level while the plant is being first watered so as to ensure that the crown of the plant will not sink down but rather will remain at the soil level, thereby advantageously eliminating both the necessity of re-positioning and/or re-transplanting the plant and any concomitant injury to the plant caused thereby.

An additional object is to provide such a planter which assures efficient and accurate planting.

Another object is to provide such a planter that is lightweight, and easy to manufacture, use and store.

These and other objects are achieved in accordance with the present invention by a planter comprised of: a supporting member, having two ends and being longer than a maximum distance across the top of the planting hole, which lies on the ground and straddles the top of the planting hole; a holding device for securing the plant to the supporting member at a position intermediate these two ends, and earth anchors for securing the supporting member to the ground on at least one side of the planting hole to prevent the planter from rotating over the hole. The holding device is preferably secured to the supporting member in such a fashion that the holding device lies at approximately soil level whenever the planter lies on the ground and straddles the planting hole.

By securing the plant to the supporting member at a point corresponding to the original planting level and anchoring the supporting member directly to the ground, the plant is held in an upright position over the planting hole at the ideal planting level. As a result, the gardener is advantageously free to use both hands to spread the roots, if bare-rooted, and is then able to stand up and, using a spade, fill the hole with soil, thereby saving considerable time and effort. As such, the gardener only needs to assume a crouching position for a very short interval of time and and is thus saved from experiencing considerable backache.

Consequently, by placing the crown of a plant at the proper vertical level before planting, use of the present invention assures an ideal planting. This is a distinct advantage over current planting techniques known to the art which usually involve planting from the bottom up—i.e. placing the roots of the plant in the bottom of the hole, and then filling the hole with soil—which, as noted, generally produce hit-or-miss results whereby the crown rarely ends up situated at the proper level.

In accordance with a feature of the invention, the supporting member may comprise a center section and a number of coaxially aligned telescoping sections, each of which can be slid into one of a number of different positions relative to that of the center section in order to to easily increase or decrease the length of the planter. This allows the planter to be used with a wide variety of differently sized planting holes.

BRIEF DESCRIPTION OF THE DRAWING

A complete understanding of the principles of the present invention may be gained by considering the following detailed description in conjunction with the accompanying drawings in which:

FIG. 2 depicts a top and partial cross-sectional view of a second embodiment of such a planter;

FIG. 3 shows a perspective and partial cutaway view of the planter shown in FIG. 2;

FIGs. 6-9 show alternate embodiments of a plant holding device for use with the planters shown in FIGS. 1, 2, or 5;

FIG. 10 depicts the manner in which the plant holding device shown in either FIGS. 8 or 9 is used in conjunction with the planters shown in FIGS. 1, 2, or 5;

To facilitate easy understanding, identical reference numerals are used to designate identical elements common to the figures.

DETAILED DESCRIPTION

Figure 1:
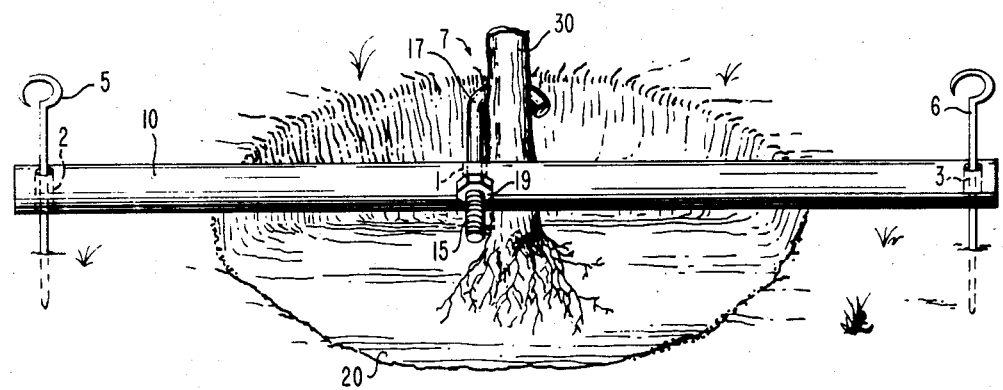
FIG. 1 depicts a first embodiment of a planter embodying the teachings of the present invention.

FIG. 1 shows one embodiment of the present invention for a planter, particularly suited for planting a small tree, bush, shrub or other woody perennial plant into a large planting hole, such as hole 20, and ensuring that the crown of the plant is accurately positioned at the soil level.

As shown, the planter is comprised of rod 10, earth anchors 5 and 6, and plant holding device 7. Rod 10, which acts as a supporting member, is longer than the maximum distance across the top of planting hole 20 and can thus completely straddle the top of the hole. To secure the rod to the ground and prevent the rod from rotating over the hole, rod 10 contains two holes 2 and 3, each situated near an opposite end of the rod. Earth anchors 5 and 6 are inserted through holes 2 and 3, respectively, and into the ground on opposite sides of the planting hole. Each anchor is sufficiently long so that a substantial portion of it can be pushed through the rod and into the ground. To permit a gardener to easily grab the earth anchors, each anchor has a curved end. In practice, each of these anchors should preferably resemble a long skewer having a point at one end, to easily pierce the ground, and a curved handle at the other end, to facilitate easy handling. Furthermore, to minimize the weight of the planter without sacrificing strength or economy, the rod can be advantageously constructed of aluminum tubing or the like.

A plant is secured to the planter through plant holding device 7. As shown, this device consists of a hook having curved end 17 and threaded end 15. The curved end is used to partially encircle the plant stem and bring the stem into tight abutting contact with rod 10. The threaded end of the hook is inserted through hole 1, which extends all the way through rod 10 and is preferably oriented perpendicular to both the longitudinal axis of the rod and the plane of holes 2 and 3. Retaining nut 19 is threaded onto threaded end 15.

To use the planter, rod 10 is first placed on the ground straddling planting hole 20 and is then secured to the ground through the use of earth anchors 5 and 6. Thereafter, stem 30 of the plant is placed within hooked end 17, and the plant is raised or lowered such that the hooked end encircles the stem at an appropriate point on the crown. Then, nut 19 is appropriately rotated on threaded end 15 to draw the hooked end closer to the rod and bring the stem, and particularly the crown, into tight abutting contact with the rod. The gardener is now free to use both hands to spread the roots, if barerooted, and to fill hole 20 with soil. Inasmuch as the planter is fully supporting the plant at the proper height, the gardener can now assume a comfortable standing position and fill the hole with soil using a fairly large shovel. Once the hole has been filled, the gardener then waters the planting hole. In the likely event that the wet soil immediately surrounding the newly transplanted plant sinks into the ground, the planter advantageously maintains the crown at its original transplanted height. Should this sinking occur, then additional soil can be added to bring the level of the planting hole even with its rim and thereby insure that the crown is at the soil level—all without injuring the plant. Once these tasks are completed, nut 19 is loosened and plant holding device 7 is removed from the plant. Earth anchors 5 and 6 are then pulled from the ground and rod 10 is lifted from the ground beside the now-transplanted plant.

Advantageously, use of the inventive planter significantly reduces the interval of time during which the gardener must remain in a crouching position. Specifically, with the planter, the gardener must only remain in this position long enough for him to position the planter on the ground and attach the plant to it. Since this time interval is quite short, the gardener is advantageously saved from experiencing considerable physical strain. Also, inasmuch as the planter holds the plant at the proper height throughout the entire transplanting operation and hence permits the gardener to use both of his hands for various tasks, such as spreading the roots and filling the planting hole with soil, the gardener advantageously saves considerable time and effort in transplanting.

Figure 4:
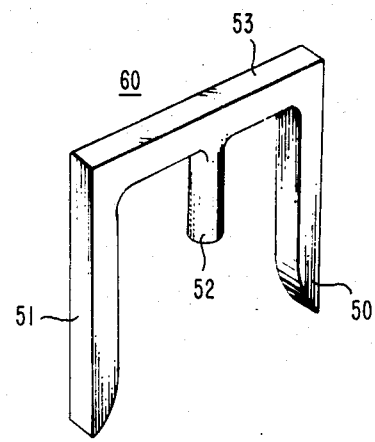
FIG. 4 shows a different embodiment of an earth anchor which may be used in conjunction with the planter shown in either FIGS. 1 or 2.
Figure 5:
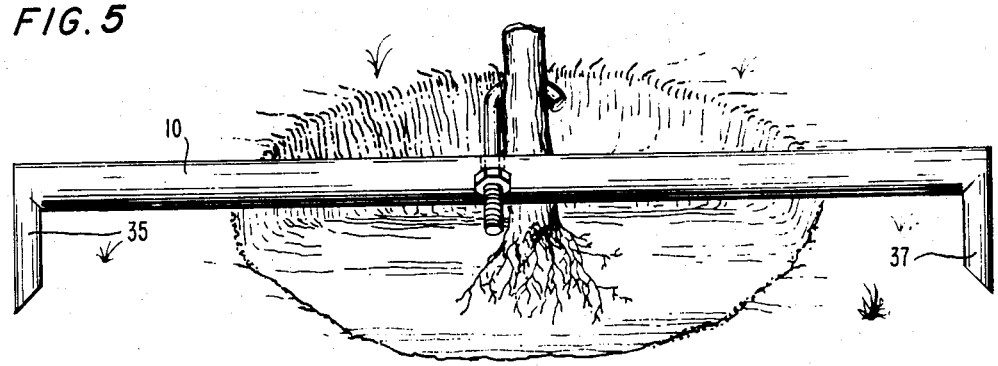
FIG. 5 depicts another embodiment of a planter embodying the teachings of the present invention.

Clearly, holes 2 and 3 in rod 10 can be oriented in many different directions, and any number of earth anchors other than the two shown in FIG. 1 may be used. For example, holes 2 and 3 need not be substantially parallel to each other as shown in FIG. 1 but can instead be oriented at an angle with respect to each other. In addition, an earth anchor can take on a variety of different shapes as long as each different shape adequately secures the rod to the ground and prevents it from rotating over the planting hole. One such alternate shape is shown in FIG. 4. Here, earth anchor 60 is generally U-shaped with two parallel relatively long pointed legs 50 and 51 joined at their top end by perpendicularly oriented top member 53. A short round coupling member, i.e. shaft 52, protrudes downward from the center of member 53. In use, anchor 60 is placed over an end of pole 10 such that shaft 52 is inserted into either holes 2 or 3, and legs 50 and 51 sandwich rod 10 and extend downward into the ground. Alternatively, the earth anchor may be an integral piece of the rod, as shown in FIG. 5. Here, earth anchors 35 and 37 each take the form of a sufficiently long downwardly extending pointed spike which is integral with rod 10 and perpendicularly oriented thereto. These spikes are pushed into the ground as the planter is being appropriately placed directly over the planting hole. Clearly, the planter shown in FIG. 1 can be mounted to the ground such that the planter straddles the planting hole with a major portion of the rod lying on one side of the hole with one or more earth anchors positioned only on that portion of the rod to secure the planter to the ground. However, the preferred embodiment, as shown, in the figures, utilizes two earth anchors situated along the rod but positioned on opposite sides of the planting hole.

Those skilled in the art will readily appreciate that planting holes can take on any one of many diameters—from fairly small to rather large. To provide a planter which can accommodate a wide variety of these holes, rod 10, instead of being a single solid piece as shown in FIG. 1, may instead be advantageously fabricated from various separate telescoping sections. An embodiment of a planter constructed in accordance with the invention and incorporating these teachings is shown in FIGS. 2 and 3. Here, the planter is comprised of five separate sections: namely, center section 40; and telescoping sections 41 and 42 situated on the left of the center section, and telescoping sections 43 and 44 situated to the right of the center section. All the telescoping sections are coaxially aligned with the center section. Plant holding device 7 is attached to center hole 1 in the same manner as that shown in FIG. 1. Here, the hooked end of the plant holding device, instead of being curved as shown in FIG. 1, is more perpendicular in nature and takes the form of an inverted "L". Clearly, the hooked end as well as the entire plant holding device itself—as will shortly become apparent—can take on any one of many different shapes as long as this device can encircle the stem of the plant and securely hold it in place.

To permit the planter to accommodate a wide variety of planting holes, the length of the planter can be easily changed by any gardener through appropriately moving one or more of the telescoping sections to any one of a number of predefined positions. For example, telescoping sections 42 and 43, each of which slide over a corresponding end of center section 40, and telescoping sections 41 and 44, which slide over corresponding ends of sections 42 and 43, respectively, can each be slid towards or away from plant holding device 7 so as to shorten or increase the overall length of the planter.

Each telescoping section can be moved totally independently of the others in order to permit the gardener to adjust the overall length of the planter over a wide range.

In particular, as shown in FIG. 2, two detents secure (lock) each telescoping section into its selected position. For example, center section 40 has diametrically opposed detents 403 and 404 situated near its left end and diametrically opposed detents 401 and 402 situated near its right end which together serve to secure telescoping sections 42 and 43, respectively, into position on the center section. Specifically, each of detents 403 and 404 engages with a respective hole, e.g. holes 422b and 421b, in a diametrically opposed pair of holes appearing in section 42. To slide telescoping section 42 into one of a variety of predefined positions two series of diametrically opposed holes—e.g. series 422 comprised of holes 422a, 422b, . . . , 422n and series 421 comprised of holes 421a, 421b, . . . , 422n—are located along this section. In a similar manner, telescoping section 41 is secured to an end of telescoping section 42 by diametrically opposed detents 424 and 423, located near an end of telescoping section 42, which engage with a selected pair of diametrically opposed holes, comprising series 411 and 412, appearing in section 41. Holes 411a, 411b, . . . , 411m and holes 412a, 412b, . . . , 412m comprise series 411 and 412, respectively. Similarly, one end of telescoping section 43 is secured to the right end of center section 40 through detents 401 and 402 located on the center section which engage with a pair of diametrically opposed holes in series 431 and 432 appearing along section 43. To provide a number of predefined positions for telescoping section 43, series 432 and 431 are comprised of individual holes 432a, 432b, . . . , 432n and individual holes 431a, 431b, . . . , 431n, respectively. In a like fashion, telescoping section 44 is secured to the other end of telescoping section 43 through diametrically opposed detents 433 and 434 which engage with a pair of diametrically opposed holes in series 442 and 441 located along section 44. Likewise, telescoping section 44 is provided with a number of predefined positions through series 441 and 442 comprised of individual holes 441a, 441b, . . . , 441m and individual holes 442a, 442b, . . . , 442m, respectively. Clearly, many other restraining devices can be used in lieu of the detents and holes shown in FIGS. 2 and 3. For example, another restraint that may be advantageously employed might include pins or shafts inserted through appropriately aligned holes located in the slidably abutting sections of the planter.

In addition, as previously discussed, plant holding device 7, as shown in FIG. 1, may itself take on many different forms. A few illustrative alternate forms are shown in FIGS. 6-9. To simplify these figures, only that portion of the center section of the planter to which the plant holding device is mounted will be shown; the remainder of the planter can be that shown in the preceeding figures.

Specifically, in FIG. 6, the plant holding device is comprised of holder 75 and clamp 73. The holder is a flat piece of fairly rigid metal configured in a spiral shape and held against center section 70 by clamp 73. To prevent the holder from rotating around the center section, one end of the clamp engages with rectangular cutout 71 in the center section. In use, plant stem 30 is placed within the opening of holder 75 and the holder is rotated in at least one of the directions shown by arrow 77 until opposite sides of the stem are firmly grasped by both inner and outer sections of the spiral holder. For use with small plants, the spiral holder may illustratively be manufactured such that dimension "d" is ½ inch (approximately 1.3 centimeters), dimension "c" is ⅜ inch (approximately 1 centimeter), dimension "b" is ¼ inch (approximately 0.6 centimeter) and dimension "a" is 3/16 inch (approximately 0.5 centimeter). These dimensions will be predicated on the range of stem diameters that a particular spiral shaped holding device is to accommodate.

Another alternate form for the plant holding device is shown in FIG. 7. Here, the holding device is comprised of a U-shaped holder 81 attached at its ends to semi-circular clamps (extensions) 82 and 83. Holder 81 is generally a piece of rigid metal or wire of inner radius "r". To adequately secure the holder to center section 80 and prevent the holder from rotating around this section, both clamps are shaped to tightly fit around half of the circumfrance of the center section with an end of each clamp fitting into one of an appropriate pair 85a, 85b, . . . , 85j, of rectangular cutouts 85. The inner radius "r" is chosen to accommodate a particular diameter of plant stem. Several such holders, each having a different radius, would normally be provided to accommodate a variety of different plant stem sizes.

Two similar additional forms of the plant holding device are shown in FIGS. 8 and 9. Here, the plant holding device takes the form of clasp 90. Specifically, the clasp is made of a sprung material, such as a suitable spring steel or the like. As shown in FIG. 8, clasp 90 is comprised of a single tubular member of semi-circular cross-section formed into elongated V-shaped piece 91 and curved piece 92. End 95 of piece 91 may be forced back by the gardener, in the direction of arrow 93, to abuttingly engage with the inner surface of end 97 of piece 92 and thereby close the clasp. Curved piece 92 is used to grasp the plant stem and is comprised of separate grasping portions formed by adjacent pairs of oppositely situated semi-circular portions 99 of approximately equal radius. Each pair has a radius different, generally less, than that of one of its adjacent pairs. A highly similar two-piece clasp is shown in FIG. 9. Here, the clasp is comprised of separate curved top piece 102 and separate base piece 103. In use, both ends of base piece 103 abut against corresponding inner surfaces of top piece 102.

To use the holding device shown in FIG. 8, a gardener first opens the clasp by appropriately moving end 95, then moves the clasp around stem 30 until the stem is securely grasped by the appropriately sized grasping portion, closes the clasp, and finally forces end 98 of piece 91 through hole 1 in rod 10. Due to the inherent springiness of the clasp and its V-shaped geometry, once the clasp is forced far enough into hole 1 as shown in FIG. 10, it remains in position by a tight friction fit. The use of the clasp shown in FIG. 9 is very similar to that just described. Several different clasps having different sized grasping portions may be used to accommodate a variety of different plant stem diameters.

Figure 11:
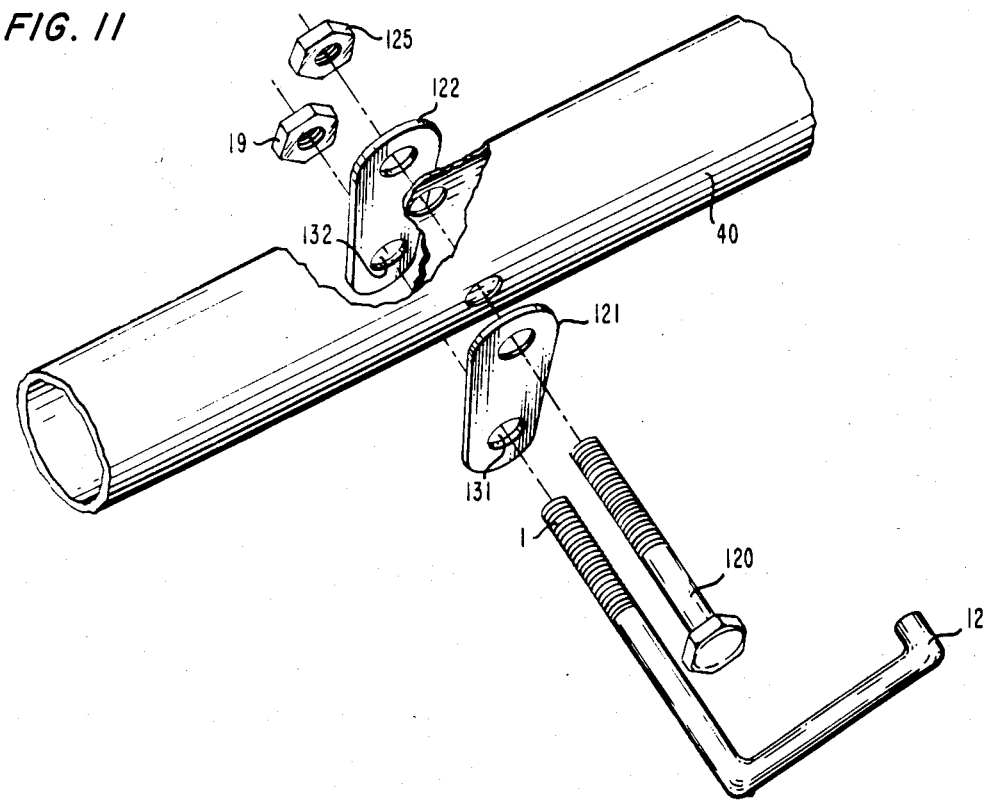
FIG. 11 depicts a top perspective view of apparatus used to secure the plant holding device, particularly that shown in FIG. 2, to a relatively large diameter rod, in accordance with the teachings of the present invention.
Figure 12:
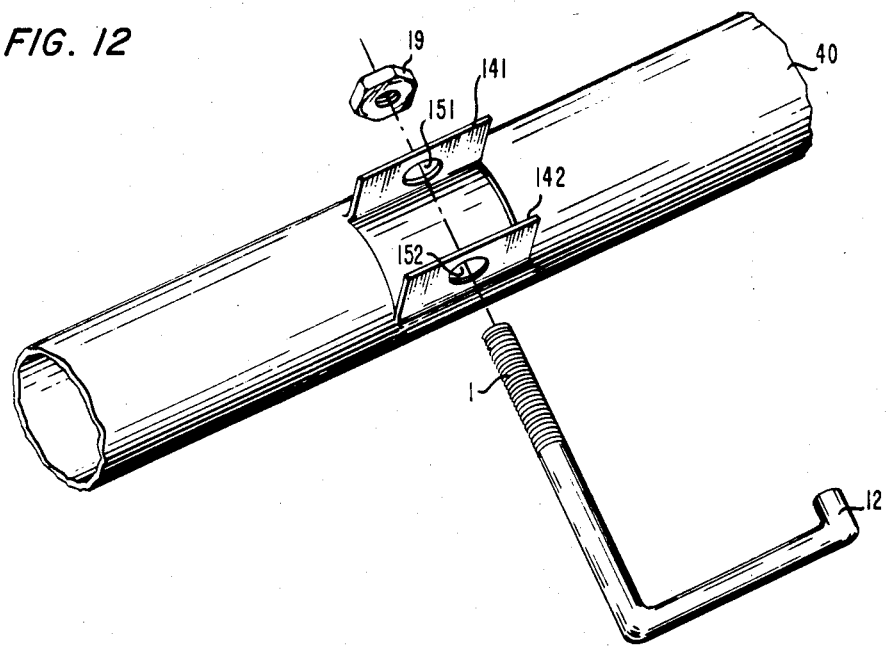
FIG. 12 depicts a bottom perspective of an alternate embodiment of the apparatus shown in FIG. 11.

Clearly, by now, those skilled in the art will readily appreciate that to ensure that the crown of a plant remains at the soil level during transplanting, the plant holding device should ideally lie even with the soil level whenever the planter lies on the ground and straddles the planting hole. However, inasmuch as the crown of a plant is not a single solitary point on the stem but rather occupies a small vertical region along the stem, some slight vertical leeway exists in securing the plant to the plant holding device while still ensuring that at least a major portion of the crown is positioned at the soil level. Hence, slight departures from the ideal can be readily tolerated. Therefore, satisfactory results will occur if a small diameter rod is used with the plant holding device secured through the center of the rod, as shown for example in FIG. 2. In this case, the holding device is positioned only slightly above the soil level whenever the planter lies on the ground and straddles the hole. Nonetheless, the plant can be readily secured to the plant holding device at a point along the crown while still ensuring that most of the crown will be positioned at the soil level. Alternatively, if a relatively large diameter rod is used in the planter, then the rod must be appropriately modified to ensure that the plant holding device is situated at the soil level whenever the planter lies on the ground and straddles the planting hole. Two embodiments of apparatus which accomplishes this result are shown in FIGS. 11 and 12. In particular, FIG. 11 shows a top perspective of one such embodiment particularly suited for the planter shown in FIG. 2. Here, two brackets 121 and 122, which both extend downwardly from rod 40, are secured to opposite sides of the rod by bolt 120 and nut 125. These brackets permit plant holding device 7 to be mounted, via holes 131 and 132, to the brackets at a location which lies at approximately the soil level whenver the planter lies on the ground and straddles the planting hole. Alternatively, the apparatus shown in FIG. 12, a top perspective, utilizes two outwardly extending tabs or protrusions 141 and 142 emanating down from the bottom of rod 40 and through which plant holding device 7 is secured, via holes 151 and 152, at the proper position.

Although only a few embodiments of the present invention are shown and discussed above, many other embodiments may be made by those skilled in the art without departing from the spirit and scope of the present invention.

I claim:

1. A planter for supporting a plant at an appropriate height over a planting hole situated in the ground, comprising;
    a supporting member, having two ends and being longer than a maximum distance across the top of the planting hole, for lying on the ground and straddling the top of the planting hole, said supporting member having oppositely situated first and second holes spaced apart a distance longer than the distance across the planting hole, wherein the first and second holes are substantially parallel to each other and oriented in a direction substantially perpendicular to the longitudinal axis of the supporting member;
    means for securing the plant to the supporting member at a position intermediate said ends; and
    means for anchoring the supporting member to the ground on at least one side of the planting hole to prevent rotation of the planter; the anchoring means including at least one generally E-shaped element, said E-shaped element having a top bridging portion, two depending pointed elongated earth penetrating legs, one pointed leg at each end of said bridging portion, and a central leg, said central leg being parallel to and shorter than said pointed elongated legs and so shaped as to cooperatively matingly interfit into said first or second hole in said supporting member, and wherein both of said elongated legs sandwich said supporting member and extend into the ground whenever said central leg is inserted into said first or second hole.

2. A planter in accordance with claim 1 wherein said securing means comprises:
    a hook having an appropriately shaped end, for at least partially encircling a stem of the plant, and a threaded end which fits into and through a third hole centrally situated in said supporting member and oriented in a direction substantially perpendicular to the longitudinal axis of said supporting member and to said first and second holes; and
    fastening means which threadedly engage with a portion of the threaded end that protrudes through said third hole to draw said shaped end towards said supporting member whenever said fastening means is appropriately turned so as to bring said plant stem into relatively tight abutting contact with said supporting member and thereby secure said plant to said supporting member.

3. A planter in accordance with claim 1 wherein said securing means comprises:
    a holder of relatively rigid material formed in a U-shape and having two ends thereof, each of said ends having a respective extension which permits said U-shaped holder to be selectively mounted to said supporting member; wherein each of said extensions is adapted to partially encircle and abut against said supporting member and to insertedly engage with a respective cutout positioned along said supporting member, whereby a plant stem placed within the U-shaped holder can be drawn into relatively tight abutting contact with the supporting member whenever the U-shaped holder is mounted to the supporting member.

4. The planter in accordance with claim 3 wherein a plurality of cutouts is positioned in and along said supporting member so as to accommodate a plurality of differently sized U-shaped holders.

5. A planter in accordance with claim 1 wherein said securing means comprises:
    a holder of relatively rigid material having inner and outer surfaces and wound in a spiral shape, and
    a clamp which maintains the outer surface of said holder in abutting contact with the supporting member and which partially encircles said supporting member while allowing said holder to be rotated against said supporting member, whereby a plant stem is placed between the inner and outer surfaces of said spiral holder and is secured to the supporting member through relatively tight abutting contact with both the inner and outer surfaces of said spiral shaped holder.

6. A planter in accordance with claim 1 wherein said securing means comprises:
    a clasp, of tubular relatively springy material having a semi-circular cross-section with inner and outer surfaces, having an elongated V-shaped base affixed to a curved grasping portion; wherein the outer surface of at least one end of said base abuttingly engages with the inner surface of a respective end of said curved portion to close said clasp, and
    wherein said curved portion is comprised of a plurality of pairs of oppositely situated circular curves, each pair of curves having substantially the same radius, and each curve of any pair being connected on at least one of its ends to a corresponding end of an adjacent curve of another pair, and each pair having a radius less than that of one of its adjacent pairs.

7. A planter for supporting a plant at an appropriate height over a planting hole situated in the ground, comprising:

a supporting member longer than a maximum distance across the top of the planting hole, having two ends and a centrally located first hole oriented in a direction substantially perpendicular to a longitudinal axis of said supporting member, for lying on the ground and straddling the top of the planting hole, means for securing the plant to the supporting member at a position intermediate said ends; said securing means comprising a hook having an appropriately shaped end, for at least partially encircling a stem of the plant, and a threaded end which fits into and through the first hole, and fastening means which threadingly engage with a portion of the threaded end that protrudes through said first hole to draw said shaped end towards said supporting member whenever said fastening means is appropriately turned so as to bring said plant stem into relatively tight abutting contact with said supporting member and thereby secure said plant to said supporting member;

means for anchoring the supporting member to the ground on at least one side of the planting hole to prevent rotation of the planter; wherein the anchoring means comprises a spike integral with and perpendicularly extending downward from an associated end of said supporting member, wherein said supporting member has a center section to which said securing means is attached and is further comprised of at least one telescoping section coaxially aligned with said center section and situated on either side thereof, and means for locking said telescoping section into any one of a plurality of pre-defined positions, said locking means being comprised of at least one detent located on said telescoping section which abuttingly engages with a selected one of a plurality of holes located in and along said center section.

8. A planter for supporting a plant at an appropriate height over a planting hole situated in the ground, comprising:

a supporting member longer than a maximum distance across the top of the planting hole, having two ends and a centrally located first hole oriented in a direction substantially perpendicular to a longitudinal axis of said supporting member, for lying on the ground and straddling the top of the planting hole, means for securing the plant to the supporting member at a position intermediate said ends; said securing means comprising a holder of relatively rigid material formed in a U-shape and having two ends thereof, each of said ends having a respective extension which permits said U-shaped holder to be selectively mounted to said supporting member; wherein each of said extensions is adapted to partially encircle and abut against said supporting member and to insertedly engage with a respective cutout positioned along said supporting member, whereby a plant stem placed within the U-shaped holder can be drawn into relatively tight abutting contact with the supporting member whenever the U-shaped holder is mounted to the supporting member;

means for anchoring the supporting member to the ground on at least one side of the planting hole to prevent rotation of the planter; said anchoring means means having at least one relatively long thin member capable of penetrating relatively dense soil and bending past sub-surface obstructions situated beneath the surface of the ground, wherein said supporting member has a center section to which said securing means is attached and is further comprised of at least one telescoping section coaxially aligned with said center section and situated on either side thereof, and means for locking said telescoping section into any one of a plurality of pre-defined positions, said locking means being comprised of at least one detent located on said telescoping section which abuttingly engages with a selected one of a plurality of holes located in and along said center section, and wherein a plurality of cutouts is positioned in an along said supporting member so as to accommodate a plurality of differently sized U-shaped holders.

9. A planter for supporting a plant at an appropriate height over a planting hole situtated in the ground, comprising:

a supporting member longer than a maximum distance across the top of the planting hole, having two ends and a centrally located first hole oriented in a direction substantially perpendicular to a longitudinal axis of said supporting member, for lying on the ground and straddling the top of the planting hole, said supporting member having second and third holes located on opposite sides of the first hole and spaced apart a distance longer than the distance across the planting hole, wherein the second and third holes are substantially parallel to each other and oriented in a direction substantially perpendicular to that of the first hole and to the longitudinal axis of the supporting member, means for securing the plant to the supporting member at a position intermediate said ends; said securing means comprising a hook having an appropriately shaped end, for at least partially encircling a stem of the plant, and a threaded end which fits into and through the first hole, and fastening means which threadingly engage with a portion of the threaded end that protrudes through said first hole to draw said shaped end towards said supporting member whenever said fastening means is appropriately turned so as to bring said plant stem into relatively tight abutting contact with said supporting member and thereby secure said plant to said supporting member;

means for anchoring the supporting member to the ground on at least one side of the planting hole to prevent rotation of the planter; wherein the anchoring means comprise two relatively long thin downwardly extending legs, each of said legs being joined at the top end thereof to one end of a perpendicularly oriented top member and has a point at the other end thereof for piercing the ground, and a relatively short coupling member downwardly extending from approximately the center location of said top member for being inserted into said second or third holes in said supporting member, and wherein said legs sandwich said supporting member and extend into the ground whenever said coupling member is inserted into said second or third holes, wherein said supporting member has a center section to which said securing means is attached and is further comprised of at least one telescoping section coaxially aligned with said center section and situated on either side thereof, and means for locking said telescoping section into any one of a plurality of pre-defined positions, said locking means being comprised of at least one detent located on said telescoping section which abuttingly engages with a selected one of a plurality of holes located in and along said center section.

* * * * *